Patented June 16, 1953

2,642,349

UNITED STATES PATENT OFFICE 2,642,349

WATERPROOF SANDPAPER AND BACKING THEREFOR

Carl W. Foss and Halsey W. Buell, Niagara Falls, N. Y., assignors to The Carborundum Company, Niagara Falls, N. Y., a corporation of Delaware No Drawing. Application February 4, 1950, Serial No. 142,524

16 Claims. (Cl. 51—295)

This invention relates to an improvement in waterproof sandpaper and backings therefor. It is especially concerned with paper backings containing a new impregnant or treatment varnish and the combination of paper thus treated with special bonds or adhesives for the abrasive grains.

Waterproof sandpaper, which has been commercially available for about thirty years, is a special form of coated abrasive or sandpaper designed particularly for use in wet-sanding surface finishes such as enamels and lacquers. It is very widely used in industry in the manufacture of automobiles, refrigerators, and other products which are enameled or lacquered, and it is also very widely used in automobile repair shops where automobile bodies are refinished. It consists essentially of a paper backing which has been treated to make it resistant to water so that it will not disintegrate when the product is used in the presence of water. The abrasive grains are held on by waterproof adhesives which heretofore have consisted of oil base varnishes or oil-modified synthetic resins.

The abrasive industry has for some time been called upon to provide two types of waterproof sandpaper, one of which is designed especially for the so-called "industrial trade," which means the manufacturers of automobiles, refrigerators, etc. The other is designed especially for the "repaint trade" where previously-manufactured products are "repainted" or, more strictly speaking, given a new coat of lacquer or varnish. The industrial trade requires a product which will be as fast cutting as possible and the conditions under which the sandpaper is used in the manufacturing plant differ from those found in a repaint shop so that the manufacturer is able to use a product which is initially more rigid and brittle than is permissible in the repaint trade. In order to obtain the utmost in speed of cut it has been found necessary to use a backing which is not inherently as limp and flexible as is required in the repaint trade and it has been the practice to provide the industrial trade with waterproof sandpaper which is too stiff and brittle to be used when it is dry but which can be, and is, made more limp by soaking in water. Although the repaint trade usually wets the waterproof sandpaper before using it, from the very nature of the work done in a repaint shop a sheet of sandpaper cannot always be used up on one job and consequently there is not the uniformity of wetting and conditions of use which are found in the manufacturing plant where the paper is used continuously until it is worn out.

It has been recognized that a fast cutting sheet of sandpaper requires a relatively stiff and incompressible backing, but heretofore it has been difficult to obtain backings which will have those characteristics when wet and not be too brittle when dry. For this reason the manufacturer of waterproof sandpaper has had to strike a compromise between the incompressibility of the paper backing which would give a fast cutting product and the flexibility or limpness which is necessary to avoid excessive brittleness.

In making waterproof sandpaper, papers are used which have been given a wet-strength treatment as by impregnating a waterleaf sheet with glue and glycerine and tanning the glue to make it water-resistant or in which wet strength has been built by incorporating other wet-strength agents such as regenerated cellulose obtained from viscose or synthetic resins such as urea formaldehyde condensation products. These papers are then customarily given three treatments before the making coat, abrasive grain, and sandsize are applied. One treatment is designed to provide inherent flexibility within the sheet itself and to increase the wet strength of the paper sheet. This is an impregnating process and is sometimes referred to as the "treatment." The second coat which is applied is a so-called "back-size" which is put on the side of the paper opposite the abrasive coating and is applied for two purposes. One purpose is to reduce the slipperiness of the back of the sheet and this is usually accomplished by incorporating in the back-size varnish a mild friction-increasing agent such as diatomaceous earth. The second purpose is to bond the paper fibers on the back side of the sheet so that the sheet does not scuff when it is used. In some products of the prior art this back-size has also been used, sometimes with a second back-size coat, to seal the paper and prevent water from penetrating the sheet. The third treatment is a so-called "presize" which is applied to the coat side of the sheet for the purpose of sealing that surface to such an extent that when the adhesive or making coat is applied it will not penetrate the paper excessively and thus starve the abrasive grain of its bond. An additional function of the presize is to fill the top surface of the paper with a varnish which is less flexible than the treatment varnish but more flexible than the making coat. In order to obtain satisfactory cutting it is necessary to use a making varnish which is much less flexible than the treatment varnish and unless a presize is applied this less flexible varnish penetrates the paper excessively and reduces the flexibility of the paper sheet.

The materials which have been used heretofore for flexibilizing and increasing the wet strength of the paper sheet, referred to as the "treatment varnishes," have been either drying or semi-drying oils or oil varnishes based on such oils. The purpose of using such materials has been to obtain limpness and flexibility of the paper per se and to actually waterproof the paper fibers so that when the paper was either soaked in water or became wet in use the paper did not disintegrate. When paper is wet with water the fibers become more limp and the sheet correspondingly becomes more flexible and less rigid but the practices of the prior art have been to use an oily material because such materials are comparatively flexible and they impart a desirable flexibility to the paper backing.

One objectionable feature of the waterproof sandpaper of the prior art where the paper is treated or impregnated with oily material is the relative slowness with which a waterproof sandpaper made on such a backing absorbs water and becomes limp. The oils are good waterproofing agents and are repellent to water so that it takes a rather prolonged soaking to get sufficient water into the paper fibers to impart the additional flexibility that is required to make the sandpaper ready for use.

It is accordingly an object of the present invention to provide a waterproof sandpaper which will be faster cutting than the products of the prior art. Another object of the invention is to make a paper backing for waterproof sandpaper which is not excessively brittle when it is dry and yet absorbs water rapidly and in comparatively large quantities and thereby becomes limp and flexible but relatively incompressible. Another object of the invention is to provide an improved waterproof sandpaper which is relatively stiff and inflexible when dry but in which the backing absorbs water rapidly and in relatively large quantities to become limp and flexible and which has a relatively high rate of cut. Another object of the invention is to provide a wet-strength sandpaper having an oil base varnish adhesive for attaching the abrasive grains to a paper base and a phenolformaldehyde condensation product sandsize over the varnish adhesive wherein the sandsize is adhered to the varnish sufficiently to prevent separation thereof from the varnish when the product is used. Other objects of the invention will be apparent from the description which follows or will be hereinafter pointed out.

We have discovered that if a wet-strength paper is treated with an oleo-resinous varnish containing the right kinds and proportions of oil and resin a paper backing is obtained which, while relatively inflexible, is not excessively brittle when dry, absorbs water very rapidly and in unusually large amounts, and when thus wet is limp and flexible but apparently relatively incompressible. Sandpaper made on such a paper sheet is very fast cutting. The treatment varnish which we employ in making our improved product is water-resistant but is not waterproof like the varnishes heretofore used. As a consequence the paper which has been impregnated with such varnish is not water-repellent but absorbs water very rapidly and in comparatively large quantities. The paper when thus flexibilized by the incorporation of water has the limpness and flexibility which is necessary but is sufficiently incompressible and rigid so that when it is used the abrasive grains are rigidly supported and the sandpaper correspondingly cuts very rapidly. The treatment varnishes which we employ are formed by reacting maleic anhydride with castor oil and then introducing glycerine and continuing the reaction until a relatively thick liquid is obtained which is thinned with a solvent. They are heat-reactive to form a very soft rubbery gel.

We will now describe our invention by reference to specific examples. It is to be understood that the examples are for illustrative purposes only and are not limitative.

*Example I*

A backing was prepared employing as a base sheet a wet-strength paper known in the sandpaper industry as "A" weight. It had a fiber weight of 40 pounds per papermaker's ream (480 sheets 24" x 36") and contained 8 pounds per ream of tanned glue-glycerine in the ratio of approximately 35 parts glue to 65 parts glycerine. The paper, which is sold commercially under the trade mark "Solkacel," was made from wood pulp having a high alpha cellulose content.

The paper was first given a treatment by roll coating with ¾ pound per sandpapermaker's (480 sheets 9" x 11") of a treatment varnish followed by a back-size on the back side of the paper of .6 pound per sandpapermaker's ream of back-size varnish which was knife coated. The treated and back-size paper was then dried for 1 hours at 150° F.

The coat side of the paper was then roll coated with ¾ pound per ream of presize varnish and was dried for 6 hours at 150° F.

The base varnish used for the first treatment consisted of a reaction product which may be described as containing about 20 parts by weight glyceryl maleate and 80 parts by weight of castor oil thinned with a high-flash naphtha known to the trade as "VX reducer" to a solids content of 79%. It was prepared by interreacting 139 parts maleic anhydride with 800 parts castor oil at a temperature of about 425–475° F. for about ½ hour and then adding 87 parts glycerine and continuing cooking for a total of about 2 hours. The product thus formed is then cut with the high-flash naphtha and cooled. It is probably an interreaction product or mixed ester of glycerine, maleic anhydride and the fatty acids of the castor oil rather than merely glyceryl maleate and castor oil. Upon heating in an open dish for several hours at 225° F. the varnish solidifies to a very soft rubbery gel which indicates that it is heat-reactive.

The coating varnish for the first treatment was made by cutting 5 parts by volume of the basic varnish with 3 parts by volume of "VX reducer."

The back-size varnish consisted of a basic varnish which was essentially a 25 gallon oil varnish, the oil being China-wood oil and the resin a hard oil-soluble phenolic resin mixed with a paste of diatomaceous earth milled into China-wood oil. This composition was cut with solvents and diluents to a viscosity of 150 centipoises at 90° F., in which condition it was applied to the back side of the treated paper.

The presize applied to the coat side of the paper was also a 25 gallon varnish in China-wood oil, the resins being a mixture of equal parts of a hard and a soft phenolic resin. The varnish was cut with solvents and diluents to a viscosity of 100 centipoises at 120° F., the temperature at which it was applied.

*Example II*

320 grit silicon carbide waterproof sandpaper was made on a backing prepared as described in Example I. In making the sandpaper the coat side of the paper was first given a roll coating of 1¼ pounds per sandpapermaker's ream of making varnish and while this varnish was still wet and adhesive 320 grit silicon carbide was applied to the adhesive coated surface to leave a grain coating of 3½ pounds per sandpapermaker's ream. The thus-coated paper was dried for ¾ hour at 200° F. and the abrasive grains were then given a sandsize by roll coating a varnish over the abrasive coated surface. The sandsize was applied to the extent of 3½ pounds per ream whereupon the product was additionally heat-treated for ½ hour at 150° F., which was gradually increased over a period of 1 hour to a temperature of 225° F., and was held at that temperature for an additional 6½ hours.

This product was then humidified to a moisture content of 6½% on the weight of the product and taken down from the festoons in which it was heat treated, wound into rolls and finally cut into sheets of conventional size. A standard test for cutting ability showed that the product removed 15.8 grams in the test as compared to 9.6 grams by a commercial product made by The Carborundum Company according to the teachings of the prior art.

The making varnish was a solution of a phenolic resin in China-wood oil similar to the basic varnish used for the back-size but cut with solvents and diluents to a total of 75% solids and a viscosity of 12,000 centipoises at 20° C. and additionally cut with "VX reducer" to a viscosity of 1000 centipoises at 120° F. at which temperature it was applied.

The basic resin of the sandsize was a heat-hardenable phenol-formaldehyde condensation product formed by reacting 1 part by weight of technical phenol containing approximately 90% phenol and 10% cresylic acids with 1.2 parts by weight of an aqueous solution of formaldehyde containing 37% formaldehyde. The reaction was brought about by refluxing for a period of approximately ½ hour the materials just described in the presence of about 5–7% of $Ba(OH)_2 \cdot 8H_2O$ and 10% by weight of dipropylene glycol, both percentages being based on the phenol. After refluxing for the specified time the reaction product was dehydrated to a concentration of approximately 80% solids and a viscosity of approximately 10,000 centipoises at 25° C. The sandsize was prepared by cutting the base resin with furfural to a viscosity of 25 centipoises at 110° F., the temperature at which it was applied, and incorporating .3% of sorbitan monolaurate based on the resin content.

The product of this example was designed to be used by the industrial trade for sanding surfaces coated with a baked enamel. It was found to be very fast-cutting and to have a long abrading life when so used.

The total amount of material removed by the products of this invention as compared with those of the prior art which were referred to above shows the superiority of the products of this invention over those of the prior art in total test material removed in a test lasting 30 minutes. Those results tell only part of the story since both the initial cutting rate and the total life are higher than would be apparent from the results reported above. Duplicate test pieces of each of the products of Example II, of a similar product made with 280 grit silicon carbide and of prior art products of those grit sizes were subjected to the standard test, which was identical in each case, and the weights of the test pieces removed were taken at intervals over a total test time of 30 minutes. The following table shows comparative results for each 10-minute interval of the tests.

| Product | Test Material Removed in— | | |
|---|---|---|---|
| | 10 Min. | 20 Min. | 30 Min. |
| Product of Example II (320 grit) | 5.5 | 10.7 | 14.9 |
| Prior art, Same Grit Size | 4.5 | 6.9 | 9.1 |
| Product similar to Ex. II but 280 grit | 5.7 | 10.9 | 15.1 |
| Prior Art, Same Grit Size | 4.5 | 7.5 | 10.1 |

Comparison of the test results of the table shows that the products of this invention removed almost as much in the third or 20–30 minute interval of the test as the product of the prior art did in the first 10 minutes of the test. The 320 grit product also removed 90% more in the 20–30 minute interval than did the product of the prior art in the same interval. In the case of the 280 grit the amount cut in the last 10-minute interval was 62% more than that removed by the product of the prior art in that interval. In both cases the rate of cut of the products of the prior art was so low at the end of 30 minutes that the products were substantially worn out. The products of this invention, in both cases, still had a very substantial amount of usable life left after the 30-minute tests.

*Example III*

A waterproof sandpaper which was designed for use in the industrial trade in sanding lacquered surfaces was made on a backing prepared as described in Example I. The coat side of the paper just prepared was first given a roll coating of 1.5 pounds per sandpapermaker's ream of making varnish and while this varnish was still wet and adhesive, 320 grit silicon carbide was applied to the adhesive coated surface to the extent of 3½ pounds per sandpapermaker's ream. The thus coated paper was dried for 1 hour at 200° F., a sandsize was then applied by roll coating over the abrasive coated surface in the amount of 3.25 pounds per ream and the sized product was then additionally heat-treated for 6 hours at 200° F. and 15 minutes at 350° F.

The product was then humidified as in Example II, taken down from the festoons and wound into rolls and finally cut into sheets of conventional size. The standard test for cutting ability showed that this product removed 11.0 grams in the test as compared to 7.5 grams removed by a commercial product of The Carborundum Company made according to the teachings of the prior art.

The making varnish employed was prepared by taking the basic varnish used for the making coat of Example II and incorporating with it a melamine-formaldehyde resin as described and claimed in U. S. Patent 2,262,728. It was prepared by blending 80 parts of the making varnish of Example II with 20 parts of a melamine-formaldehyde resin. The viscosity of the making varnish was 2000 centipoises at 120° F. and the varnish contained about 70% solids.

The sizing varnish was basically the same varnish as the making varnish but was additionally cut to a viscosity of 500 centipoises at 120° F. It contained about 67% solids.

In developing our process we employed a method of testing backings or paper sheets to determine the rate at which they absorb water and the total amount of water which the paper will absorb. The method consists in first conditioning the sheet in atmosphere maintained at 50% relative humidity at 70° F. and weighing it, then immersing it in water for 1 minute, removing it from the water and drying off the surface water by placing it between cloth towels, and immediately weighing to determine the increase in weight which is a measure of the water absorbed. After thus weighing, the paper is again immersed in water for another minute and then again dried and weighed as before. This test method is followed usually by weighing at the end of 1-minute intervals of soaking for the first 5 minutes, then soaking for 2 minutes, drying and weighing, and from there on allowing longer periods of soaking up to a total of 45 minutes, at the of which time the paper will have absorbed substantially all the water which it is capable of taking up. In our test we employ a sheet of paper 2 inches by 4 inches and we calculate the percentage of water absorbed based on the weight of the cellulose fibers in the paper.

In our study we found that paper which had been treated with oils or oily varnishes absorbed water much less rapidly than paper which had been treated with our improved treatment varnish and that the total amount of water was always less, even though the amount of varnish or oil applied to the paper was the same. For convenience we characterize the papers by noting the amount of water absorbed in the first minute, at the end of 5 minutes, and after a total of 45 minutes.

The following table shows the amount of water absorbed by a wet-strength paper such as that described in Example I when the paper had been treated with the indicated amounts of the various treating oils or varnishes, together with corresponding figures for the paper without any treatment varnish:

| Treating Material | Pounds per Ream of Treating Material | Percent Water Absorbed on Fiber Weight of Paper | | |
|---|---|---|---|---|
| | | In 1 Min. | In 5 Min. | In 45 Min. |
| No treatment | | 80 | 94 | 108 |
| China-wood oil | 1.0 | 45 | 56 | 67 |
| Linseed oil | 1.0 | 56 | 68 | 80 |
| Soybean oil | 1.1 | 59 | 69 | 84 |
| Varnish of the prior art | .9 | 55 | 68 | 79 |
| Varnish of our invention | .9 | 71 | 77 | 97 |

The amount of treating materials used in the tests of the foregoing table are somewhat more than those employed in making coated abrasives according to our invention but less than those recommended in prior art patents. The following table shows the results of treatment with the same materials in still larger quantities.

| Treating Material | Pounds per Ream of Treating Material | Percent Water Absorbed on Fiber Weight of Paper | | |
|---|---|---|---|---|
| | | In 1 Min. | In 5 Min. | In 45 Min. |
| No treatment | | 80 | 94 | 108 |
| China-wood oil | 1.7 | 17 | 51 | 59 |
| Linseed oil | 1.6 | 49 | 59 | 65 |
| Soybean oil | 1.6 | 50 | 61 | 67 |
| Varnish of the prior art | 1.4 | 47 | 60 | 65 |
| Varnish of our invention | 1.4 | 65 | 72 | 86 |

The varnish of the prior art referred to in the foregoing tables was obtained by cooking 6.7 parts of an oil soluble phenolic resin in 13.3 parts of China-wood oil, adding 80 parts of linseed oil, and cutting with solvent to a viscosity of 100 centipoises at 20° C. The varnish of this invention was made as described in Example I.

While we usually employ a paper made from wood pulp, the sandpaper industry also uses papers made from pulps containing at least 75% rope fibers, such papers being commonly referred to as "rope papers." We also investigated the relative rate and amount of water absorbed in wet-strength papers made of rope paper by treating such paper of substantially the same basis weight as that used in the tests reported in the previous tables with glue and glycerine and tanning as in the case of the wood pulp papers to obtain an "A" weight wet-strength paper. These tests showed that the wood pulp paper is inherently more absorbent than the rope papers as evidenced by the lesser amount of treatment material absorbed by the papers and by the lower rate and total quantity of water absorbed by the untreated wet-strength rope paper. The following table shows the results obtained on rope paper treated and tested as described above.

| Treating Material | Pounds per Ream of Treating Material | Percent Water Absorbed on Fiber Weight of Paper | | |
|---|---|---|---|---|
| | | In 1 Min. | In 5 Min. | In 45 Min. |
| No treatment | | 65 | 74 | 90 |
| China-wood oil | .5 | 52 | 68 | 78 |
| Linseed oil | .7 | 60 | 71 | 84 |
| Soybean oil | .7 | 63 | 71 | 84 |
| Varnish of the prior art | .5 | 55 | 71 | 82 |
| Varnish of our invention | .6 | 65 | 76 | 90 |

The preceding tables show the results of tests on wet-strength papers which have been treated only with the impregnating or treatment varnish. The finished waterproof sandpaper has additional coats which reduce the amount of water absorbed by the paper. However, products made on backings treated in accordance with our invention have a much higher initial absorption rate as well as a higher total of water absorbed than do sandpapers made according to the prior art. Those facts are shown in the following table, wherein a comparison is made between sandpaper of various grit sizes made according to our invention and others made according to the prior art. In each instance the backing was an "A" weight paper which, as has been stated, is basically a water-leaf paper weighing in the range of 38–42 pounds per ream and treated with about 8 pounds per ream of glycerine and tanned glue.

| Product | Grit Size | Percent Water Absorbed on Fiber Weight of Paper | |
|---|---|---|---|
| | | In 1 Min. | In 45 Min. |
| Our Invention | 280 | 27 | 86 |
| Prior Art | 280 | 11 | 41 |
| Our Invention | 320 | 19 | 59 |
| Prior Art—A | 320 | 7 | 34 |
| Prior Art—B | 320 | 9 | 45 |

We attribute part of the improvement made in products according to our invention to the type of treatment applied to the paper and part of it to the use of a sandsize comprising a heat-hardened phenol-formaldehyde resin. In order to obtain adhesion between a straight phenol-formaldehyde resin sandsize and the oil base varnish as described in Example II we have found it desirable to incorporate in the resin a so-called "wetting agent" which, as is known, is a complex chemical compound having terminal polar and non-polar molecules or groups. The amount of such wetting agent required is relatively small, being of the order of 0.1 to 0.5% of the solids content of the phenol-formaldehyde resin. While it is possible to obtain satisfactory adhesion, at least for some purposes where the sanding operation is not very severe, without the use of a wetting agent, we prefer to include one since we have found that by using it we greatly improve the adhesion between the two bonding compositions. In general we have found that non-ionic agents, and particularly hydrophobic esters of long chain fatty acids with polyhydric alcohols or alcohol-ethers which form a water-in-oil type of emulsion are satisfactory for this purpose. Typical compositions are the pentaerythritol, sorbitol or sorbitan monoesters of fatty acids containing from 12 to 18 carbon atoms such as those esters of lauric, palmitic and oleic acid. One specific composition which we have found to be very well suited for this purpose is sorbitan monolaurate, although we may also use other esters within the scope defined above, such as sorbitan monopalmitate, monostearate, monooleate and monocaprate or the monoesters of the same acids with pentaerythritol or other polyhydric alcohols, or with polyhydric alcohol-ethers such as diethylene or the polyethylene glycols, sorbitan, mannitan, mannide and sorbide. In general we use an ester of a polyhydric alcohol or alcohol-ether which contains from three to six hydroxyl groups or equivalent ether-oxygen although the criterion for the selection of the wetting agent is that it contains a balance of hydrophobic and hydrophilic groups such that the esters form a water-in-oil emulsion.

In carrying out our invention we have usually found it desirable to employ a presize on the coat side of the paper as well as a back-size, both such coats being in accordance with the practices of the prior art. The back-size which we employ is used to deposit on the back of the paper a fine layer of a mild friction-increasing material and to prevent the paper from scuffing when the product is used. Unlike the teachings of some of the patents of the prior art, we do not use the back-size to seal off the paper and prevent absorption of water by the paper. On the contrary, we select the back-size and apply it in such quantity as to reduce to a minimum the sealing effect since one of the advantages of the products of our invention comes from the fact that they absorb water so rapidly as to become usable in a matter of a minute or so whereas products of the prior art require relatively prolonged soaking up to as much as a half hour before they attain the optimum flexibility.

In using the products of the prior art it has been necessary to immerse sheets of waterproof sandpaper in water as by soaking them in a pail of water for these prolonged periods of time. In contrast to this the practice in using the products of our invention is to immerse them in water for about a minute and then withdraw them and allow them to stand for a minute or upwards. Such treatment makes them perfectly satisfactory for use. One practice, for example, is for the workman to wet up a handful of sheets in the manner described and put all except one sheet in a pocket of his clothing. When a sheet is worn out the workman then merely removes another sheet from his pocket and continues. The ability to condition sandpaper in the manner described is considered by users to be a decided advantage over the practice required with the products of the prior art. Furthermore, as we have stated, the cutting rate and total amount of abrasive removed by the products of our invention are both substantially higher than that obtained with products made according to the teachings of the prior art.

As has been stated, the treatment varnish which we use to impregnate the wet-strength paper makes the paper sufficiently water-resistant to withstand the wet abrading operation and yet the papers absorb water rapidly and in larger amounts than papers treated according to the disclosure of the prior art. While we do not wish to be bound by any theories, it is our belief that this unusual characteristic may be due to the presence in the treatment varnish of uncombined hydroxyl groups, thus making the varnish something in the nature of a wetting agent while still retaining sufficient water resistance to protect the cellulose fibers of the paper to the required extent. This theory is supported by the facts that the basic treatment varnish of Example I is self-emulsifying to form an oil-in-water emulsion and that the principal fatty acid of castor oil contains a free hydroxyl group.

In the specific example we have described the use of a varnish containing about 20% glyceryl maleate and 80% castor oil. In general we have found that an increase substantially above 30% of the glyceryl maleate and 70% of the castor oil tends to make the paper sheet somewhat too brittle whereas an increase in the oil length or the use of semi-drying and drying oils instead of castor oil, makes the sheet initially more flexible but less water-absorbent and such varnishes tend to migrate into the presize and making varnishes. In general we have found it desirable to employ treatment varnishes containing at least 10% of the theoretical glyceryl maleate to 90% of the oil. There is a limit to the amount of resin which can be used which is determined by the fact that the paper sheets become so brittle when they are dry that they are unsatisfactory from a commercial standpoint. On the other hand, the use of treatment varnishes which are relatively oily in character reduces the initial dry brittleness but makes the sheet less rapidly absorbent of water and apparently more compressible since the cutting rate of sandpaper made on paper treated with oily treatment varnishes is less than that of sandpaper made on paper treated with resinous varnishes. Furthermore, paper treated with drying oil varnishes becomes more brittle upon aging, presumably due to a continued oxidation of the drying oil of the varnishes. In fact, such brittleness appears to involve also the cellulose fibers themselves since aged sheets impregnated with drying oil varnishes can be treated to soften the varnish but are still weak, indicating an effect of some sort on the paper fibers.

The amount of treatment varnish incorporated in the paper has some effect on the rate of water absorption and the total amount of water absorbed by the paper. Furthermore, if too much treatment varnish is used the paper does not satisfactorily absorb the back-size varnish and the back of the product is left oily and slippery. We have found that the effect of variations in the amount used on the rate of water absorption is relatively less with the treatment varnishes of our invention than is the case with the oils and compositions of the prior art. In the example we have described the use of ¾ pound of a varnish containing approximately 50% solids in the treatment of a 40 pound paper. Such quantities provide approximately 8% varnish solids based on the weight of cellulose fibers of the paper. In general we prefer to use quantities in the order of 5–12%. These quantities are substantially less than those described in the prior art where the purpose has been to render the paper substantially waterproof by incorporating sufficient quantities of oily materials to actually make the cellulose fibers of the paper water-repellent.

We have described the preferred method of carrying out our invention and have illustrated the invention by reference to specific examples. We have also advanced theories as to the reactions involved in making the treatment varnish and other theories to account for the improvements made according to our invention. It is to be understood that we are not to be limited by the specific examples nor bound by the theories but, rather, that the invention is to be interpreted as having the scope defined in the following claims.

We claim:

1. A paper backing adapted for the manufacture of waterproof sandpaper comprising a waterleaf sheet containing cellulose fibers, a wet-strength agent, and about 5–12% by weight based on the weight of the cellulose fibers of the heat-solidifiable reaction product of a treatment varnish consisting essentially of the interreaction product of about 7–21 parts of maleic anhydride, about 90–70 parts of castor oil and about 4.3–13 parts of glycerine, the proportion of the said reactants being substantially those present in glyceryl maleate and castor oil and of such magnitude as to calculate to about 10–30% glyceryl maleate and 90–70% castor oil, said interreaction product being reacted to such an extent that a solution of about 80% by weight of the product in high-flash naphtha has a viscosity of about 400–800 centipoises and a specific gravity of about 0.980 at 25° C. and being self-dispersible in water to form a substantially stable oil-in-water emulsion.

2. An article as claimed in claim 1 in which the paper backing also has a solidified coating of both a presize and a back-size varnish, the back-size varnish being an oleo-resinous varnish and being sufficiently high in resin content and present in such an amount as to minimize the sealing effect thereof.

3. An article as claimed in claim 2 in which the cellulose fibers are derived from wood pulp.

4. An article as claimed in claim 3 in which the wet-strength agent is tanned glue-glycerine.

5. Waterproofing sandpaper comprising a paper backing as claimed in claim 1 and having a layer of abrasive grains attached to the backing by a heat-hardened waterproof bond.

6. An article as claimed in claim 5 in which the bond comprises essentially a making coat of an oleo-resinous varnish and a sandsize coat comprising essentially the heat-hardened reaction product of a liquid condensation product of phenol and formaldehyde catalyzed by an alkaline earth hydroxide.

7. An article as claimed in claim 6 in which the catalyst is barium hydroxide.

8. An article as claimed in claim 7 in which the liquid sandsize also contains about 0.1–0.5% of a wetting agent consisting essentially of a hydrophobic ester of a polyhydric alcohol and a fatty acid containing 12–18 carbon atoms.

9. An article as claimed in claim 8 in which the wetting agent comprises essentially sorbitan monolaurate.

10. A paper backing adapted for the manufacture of waterproof sandpaper comprising a waterleaf sheet containing cellulose fibers, a wet-strength agent, and about 5–12% by weight based on the weight of the cellulose fibers of a varnish having substantially the physical and chemical properties of a product obtained by reacting about 7–21 parts of maleic anhydride with about 90–70 parts of castor oil for about ½ hour at a temperature of about 425–475° F. and then adding about 4.3–13 parts of glycerine and continuing heating for a total time of about 2 hours, the proportions of glycerine, castor oil and maleic anhydride being such as to provide in the finished product a theoretical glyceryl maleate in the proportion of about 10–30% and castor oil in the proportion of about 90–70% and the total of the theoretical glyceryl maleate and castor oil always being 100%.

11. An article as claimed in claim 10 in which the paper backing also has a solidified coating of both a presize and a back-size varnish, the back-size varnish being an oleo-resinous varnish sufficiently high in resin content and present in such an amount as to have little effect on the rate of water absorption of the treated paper.

12. Waterproof sandpaper comprising a paper backing as claimed in claim 11 and having a layer of abrasive grains attached to the presize side of the backing by a heat-hardened waterproof bond.

13. Waterproof sandpaper comprising a paper backing as claimed in claim 10 and having a layer of abrasive grains attached to the backing by a heat-hardened waterproof bond.

14. Waterproof sandpaper as claimed in claim 13 in which the bond comprises a making coat of an oleo-resinous varnish and a sandsize coat comprising essentially the heat-hardened reaction product of a liquid condensation product of phenol and formaldehyde.

15. Waterproof sandpaper as claimed in claim 14 in which the liquid sandsize also contains about 0.1–0.5% of a wetting agent consisting essentially of a hydrophobic ester of a polyhydric alcohol and a fatty acid containing 12–18 carbon atoms.

16. Waterproof sandpaper comprising a paper backing as claimed in claim 13 in which the bond comprises essentially a drying oil base varnish containing both a phenolic resin and a melamine-formaldehyde resin.

CARL W. FOSS.
HALSEY W. BUELL.

References Cited in the file of this patent

UNITED STATES PATENTS

| Number | Name | Date |
|---|---|---|
| 2,004,466 | Dietz | June 11, 1935 |
| 2,123,062 | Pellett | July 5, 1938 |
| 2,173,129 | Oglesby | Sept. 19, 1939 |
| 2,184,293 | Edgar et al. | Dec. 26, 1939 |
| 2,199,752 | Oglesby | May 7, 1940 |
| 2,357,350 | Oakes | Sept. 5, 1944 |

OTHER REFERENCES

"Spans and Tweens," Hercules Powder Company, 1942 edition, pages 7 and 11.